US006396380B1

(12) United States Patent
Girke et al.

(10) Patent No.: US 6,396,380 B1
(45) Date of Patent: May 28, 2002

(54) ELECTRICAL FUSE BOX FOR MOTOR VEHICLES

(75) Inventors: Jürgen Girke; Karl-Heinz Wohlfahrt, both of Radolfzell (DE)

(73) Assignee: TRW Automotive Electronics & Components GmbH & Co. KG (DE)

( * ) Notice: Subject to any disclaimer, the term of this patent is extended or adjusted under 35 U.S.C. 154(b) by 0 days.

(21) Appl. No.: 09/171,112

(22) PCT Filed: Mar. 5, 1997

(86) PCT No.: PCT/DE97/00414

§ 371 (c)(1),
(2), (4) Date: Jan. 25, 1999

(87) PCT Pub. No.: WO97/40510

PCT Pub. Date: Oct. 30, 1997

(30) Foreign Application Priority Data

Apr. 19, 1996 (DE) ........................................ 196 15 561

(51) Int. Cl.[7] ........................ H01H 85/20; H01H 85/38; H01H 85/02; H02B 1/18

(52) U.S. Cl. ....................... 337/189; 337/256; 337/188; 337/278; 361/642

(58) Field of Search ................................ 337/189, 158, 337/159, 161, 188, 229, 256, 290, 278; 361/104, 626, 642, 646, 775, 804; 439/76.2; 174/72 B, 71 B, 68.2

(56) References Cited

U.S. PATENT DOCUMENTS 3,163,728 A * 12/1964 Martin ...................... 200/50.1
4,570,147 A * 2/1986 Ebi ............................ 337/166
4,842,534 A * 6/1989 Mobley et al. ............. 439/214
5,023,752 A * 6/1991 Detter et al. ................ 361/399
5,088,940 A * 2/1992 Saito .......................... 439/621
5,154,647 A * 10/1992 Ishitani et al. .............. 439/933
5,162,773 A * 11/1992 Shiozaki ..................... 337/201
5,179,503 A * 1/1993 Fouts et al. ................. 361/393
5,438,310 A * 8/1995 Ikari .......................... 337/208
5,504,655 A * 4/1996 Underwood et al. ........ 361/707
5,643,693 A * 7/1997 Hill et al. ................... 429/121
5,645,448 A * 7/1997 Hill ............................ 439/522
5,645,457 A * 7/1997 Hirayama et al. .......... 439/801
5,731,944 A * 3/1998 Yasukuni et al. ........... 361/104
5,764,487 A * 6/1998 Natsume ..................... 361/775
5,785,532 A * 7/1998 Maue et al. .................. 439/34
5,841,338 A * 11/1998 Yasukuni .................... 337/293
5,886,611 A * 3/1999 Schaller et al. ............. 337/189

FOREIGN PATENT DOCUMENTS

JP 56-103637 * 8/1981 ........... B60R/16/02
JP 5-159693 * 6/1993 .......... H01H/85/56

* cited by examiner

*Primary Examiner*—Lynn D. Feild
*Assistant Examiner*—Anatoly Vortman
(74) *Attorney, Agent, or Firm*—Fay, Sharpe, Fagan, Minnich & McKee, LLP

(57) ABSTRACT

A fuse box for motor vehicles includes a housing that is adapted to contain electrical fuses mounted to a common busbar for connecting one end of the fuses directly to a pole of an electric battery in the vehicle. The housing includes lateral surfaces for providing torsional protection to the fuses against twisting or bending when the nuts holding the fuses in place are tightened. Screening zones are defined in the housing for screening off fusable portions of the fuses so that melted material is prevented from migrating into the housing beyond the screening zone where the melted material may cause damage. Mechanical coding structures are provided in the housing to ensure that only cable terminals having a shape corresponding to the coding structures can be installed in selected regions of the fuse box. This prevents inadvertent misuse of cross-connection of cables having inadequate or excessive current carrying capacity. A removable intermediary bottom member carries the lateral surfaces, screening zones and other mechanical coding structures so that the subject fuse box can be easily reconfigured.

27 Claims, 4 Drawing Sheets

ELECTRICAL FUSE BOX FOR MOTOR VEHICLES

BACKGROUND OF THE INVENTION

The subject invention is directed toward the art of electrical fuse boxes and, more particularly, to an electrical fuse box that attaches directly to the battery of a motor vehicle to ensure that shorts occurring in high current conducting wires are fused near the battery rather than at remote locations such as, for example, under the hood or in vehicle kick panels.

The invention is especially useful in the motor vehicle art and will be described with reference thereto; however, the invention is capable of broader application and could be used in other type vehicles and in many environments such as industrial processes.

It is well known in the motor vehicle art to place fuse boxes in the anterior area of the vehicle such as, for example, under the hood within the engine compartment or behind kick guards in the foot area of the interior of the motor vehicle. The fuse boxes serve to accept electrical fuses for individual electrical load consumers within the vehicle such as individual lights or small equipment items and also to accept electrical fuses for large cable strands carrying large amounts of current branching off from the fuse box for servicing entire load sections within the vehicle. Typical fuse boxes are connected to the positive pole of the motor vehicle battery via one or more cables leading to the fuse box whereat power is supplied to a plurality of fuses contained within the box. The ends of the fuses opposite the end connected to the positive terminal of the battery generally are connected to outgoing cables or cable strands to supply power to electrical consumers such as, for example, motor vehicle lighting systems, sensors and switches, and power accessories.

With regard to fuse protecting the smaller general electrical consumers within the motor vehicle, each of the electrical consumers is simply connected to the outgoing end of a respective fuse. In that way, if a short occurs in the power consumer end, the fuse simply melts at a designated melting zone thereby opening the electric circuit and disconnecting the power consumer from the battery downstream of the fuse box. However, when the fuse box is employed to serve and electrically protect entire cable strands that are typically used to serve a large number of electrical connectors, a plurality of smaller sized fuses are generally employed downstream of the large cable from the fuse box so that each of the individual power consumer circuits branching off from the main cable strand can be fuse protected.

For the protection of large cable strands carrying high amounts of current, large fuses are used. They are commonly referred to in the industry as "strip fuses". The so-called strip fuses generally have no housing of their own and are typically employed to fuse protect cable strands that are expected to conduct high amounts or levels of electrical current. In contrast to the readily manually installable flat fuses which are commonly used to electrically fuse protect individual power circuits in the motor vehicle, the replacement of the strip fuses are usually performed only by skilled personnel since the destruction of strip fuses serving entire cable strands is usually an indication of a serious fault in the electrical wiring of the motor vehicle. Serious faults of this type usually result in excess current intensities and consequently melt a fusible area formed in the respective strip fuse.

On the other hand, the replacement of ordinary insertable flat fuses used to fuse protect individual electric consumer circuits in the motor vehicle is typically within the capabilities of untrained personnel such as, for example, motor vehicle operators or owners. Manufacturers of motor vehicles entrust operators to perform insertable flat fuse replacement because their failure is usually caused only by minor electrical faults such as, for example, a short-circuit occurring in the filament of an electrical bulb when it fails.

One major disadvantage of typical fuse boxes used in the past is made evident during a motor vehicle accidents, in particular, during collisions. In that regard, during certain motor vehicle crashes that result in a mechanical destruction of the electrical cable strands extending between the fuse box and the vehicle battery, short circuits can be produced between the end of the destroyed electrical cable strand and the motor vehicle frame or other vehicle component connected to ground. The severed end of the electrical cable strand of course continues to be connected to one pole of the motor vehicle battery on one end and directly to the body or frame of the motor vehicle on the other or destroyed end. Of course, the motor vehicle body or frame is typically connected to the oppositely polarized terminal of the motor vehicle battery creating a dead short having high current carrying capacity. In such event, sparks are typically generated sometimes causing motor vehicle fires and explosions.

There is a need, therefore, to provide a fuse box for use with motor vehicles which will safely prevent short circuits and the hazards caused thereby even during motor vehicle crashes. It is further desired that such a fuse box can be produced in a simple and cost effective manner and can be easily installed in a wide range of motor vehicles and other electromechanical devices.

SUMMARY OF THE INVENTION

In accordance with the subject invention, an electrical fuse box for use in motor vehicles is provided having a housing adapted at a first location to receive an associated electrical strip fuse for protecting a high current conducting wire strand. The strip fuse has a melting zone formed therein designed to melt and open a circuit conducting current that reaches a level beyond a predetermined threshold. The electrical fuse box includes at least one screening zone formed by the housing. The screening zone defines an area located relative to the first location of the strip fuse for collecting liquid melted material generated when the strip fuse melts. In that way, melted material is contained within the screening zone to prevent damage to the other circuits disposed in the fuse box. The melted fuse material is thereby prevented from migrating into other areas of the housing.

Preferably, the fuse box is connected directly to one terminal of the motor vehicle battery to ensure that there are no "live" wires, i.e. wires connected to a source of power, extending between the battery and the fuse box. In the event of a crash of the vehicle or destruction to the fuse box, all of the current conducting wires routed through the vehicle are protected by fuses that are connected on one end directly to the battery.

In accordance with the invention, the fuse box is arranged for direct connection to the battery of the motor vehicle. In that way, reasonable assurance is provided that, in the event of a vehicle crash, there will be no destruction of cable strands not protected by a fuse. In that way, the formation of sparks caused by the short circuiting of unprotected cable strands is unlikely or impossible.

In accordance with another aspect of the invention, the fuses used to electrically protect cable strands carrying large amounts of current are preferably strip fuses which are inexpensive and generally readily available.

In the preferred embodiment of the invention, the fuse box is adapted to connect one end of several strip fuses directly to an electrical pole of the motor vehicle battery through a common busbar.

In accordance with yet another aspect of the invention, first ends of the multiple strip fuses contained within the fuse box are connected to the common busbar using screws and nuts to provide minimal connection transition resistance between the fuses and the battery. Bushings are also arranged between the fuses and the terminal elements within the fuse box. This arrangement results in the benefit of a very simple mechanical construction and thus realizes a cost effective fuse box that is readily and inexpensively produced.

In accordance with the preferred embodiment of the invention, each strip fuse includes a pair of drill holes which adapt the fuse ends for attachment by means of a threaded bolt and nut. The end of the strip fuse which contacts the common busbar is placed upon a threaded bolt which protrudes via a bore hole into the common busbar and is securely fixed to the busbar by means of a nut threaded onto the bolt. A spring plate is preferably inserted between the fuse and the nut. The spring plate serves to maintain a predetermined starting torque for the nut so that the nut does not vibrate loose from the bolt. A lock washer could equivalently be used in place of the spring plate.

The spring plate and mechanical nut and bolt attachment of the fuse is particularly advantageous when the strip fuse is made of zinc. It has been shown that during the course of time the staring torque for removing the nut is reduced as a result of a setting property of the zinc material, particularly under the effect of temperature cycles upon the connection between the busbar and the strip fuse.

In accordance with another preferred aspect of the invention, lateral contact surfaces are provided in the fuse housing for providing torsional protection to the installed strip fuses. The torsional protection results in the advantage that twisting or deformation of the fuse is avoided or prevented during the tightening of the nut onto the bolt head as the fuse is attached in place.

In addition, in the preferred embodiment of the invention, the housing is formed in a manner that the fusible areas of the strip fuses are each individually isolated from each other and from other fuses by a set of screening zones provided in the housing. The screening zones provided for each individual strip fuse results in the advantage that as the fusible area of the fuse blows and is melted, the melted material is contained within the screening zone in both liquid and then frozen states, and is thereby prevented from migrating into unsuitable or undesirable areas within the housing. In prior fuse boxes, no such screening zone was provided and, accordingly, melted material oftentimes migrated into undesirable areas within the housing having deleterious effects on other electrical circuits within the housing.

In accordance with yet another aspect of the invention, the screening zones provided for each individual strip fuse in the subject fuse box also functions to provide mechanical coding with respect to the current carrying capacity of the strip fuse to be installed at each individual screening zone location. In this manner, it is possible to avoid installing fuses with higher rated current carrying capacity in the fuse locations designed for lower rated currents. Conversely, the mechanical coding feature provided by each individual screening zone ensures that fuses with lower rated current carrying capacities do not physically fit into in connection locations where strip fuses having higher current capacities are needed. Generally, strip fuses having higher rated current carrying capacity, while having identical thickness to lower rated fuses, have broader melting zones than fuses with lower rated currents.

In a similar fashion, the regions of the housing adapted to accept cable terminal ends are preferably formed in such a manner to achieve a mechanical coding based on the physical size of the conductors and terminal ends. To that end, it is anticipated that there is a difference in the geometric shape of the individual current carrying cable terminals at the ends of the cables that are connected to the fuse box. The housing is shaped to prevent a mismatch between the terminals and the desired terminal locations. In this manner, accidental erroneous installation of the cable terminals into the fuse box is avoided so that cable terminal ends are not connected to fuse locations where they are not intended to be placed.

In addition to the coding measures of the housing described above, it is a further aspect of the invention to provide the lateral openings used for leading the respective cables into and out of the fuse box with openings sized essentially to correspond with the outer diameter of the respective cables expected to extend therethrough. Since cables for conducting higher currents are generally thicker than cables intended to conduct lower currents, the multiple varied opening sizes of the cable entrance ports further prevents installation of cables intended for higher currents at fuse locations intended to serve lower current circuits. Conversely, the multiple varied entry port sizes make the installation of thinner cables for lower currents at fuse locations for higher currents immediately evident because, in that case, the cable is not tightly sealed off by the housing cable entrance port nor is it securely retained in the housing side wall. Rather, the small cable is only loosely held in the opening.

Preferably, in accordance with the fuse box of the present invention, the contact surfaces of the housing providing torsional protection for the strip fuses, the screening areas providing melt zones for the fuses, the fuse coding areas, and the cable terminal coding areas are all formed in intermediary bottom members which are adapted to be selectively installed within the fuse box housing. A set of intermediary bottom members having different size combinations of the above features enables the fuse box to be adapted to accommodate different fuse values and different quantities of fuses. Also, the intermediary bottom member enables captively retaining the threaded bolts in the housing so that the thread zones of the threaded bolts project through bore holes into the intermediary bottom member. The headpieces of the threadbolts are held between the housing bottom and the underside of the intermediary bottom member.

In the preferred embodiment of the subject fuse box, each of the threaded bolts used to fasten the strip fuse ends protrude through a captive spring bushing which is retained in the housing, preferably pressed in. When the intermediary bottom member is employed, the spring bushing may be pressed into a bore hole provided therein. The spring bushing has, in this arrangement, a bushing region extending generally axially relative to the threaded portion of the threaded bolt. The bushing region is adapted to be pressed into the intermediary bottom member. The spring bushing also includes a radially extending collar for resilient placement of the strip fuse thereon. The radially extending collar ensures, by means of its resilient property, that the initial starting torque of the nut is maintained when fastening the respective cable terminal at the threaded bolt or the respective fuse end.

By providing captively retained threaded bolts and spring bushings in the housing, the fuse box can be supplied by the manufacturer of the fuse box with preinstalled strip fuses. The preinstalled strip fuses and captively retained threaded bolts and spring bushings make it possible, when installing the fuse box in a motor vehicle, to merely attach the fuse box onto the battery and then connect the cable terminals to the respective free ends of the strip fuses.

In the preferred embodiment of the fuse box according to the invention, the housing member comprises a cover member which is connectable to the remaining portion of the housing in a water proof and moisture proof manner. In this arrangement, a housing member lid is connectable with a remaining or bottom portion of the housing by means of a snap mechanism, suitable hinges, screws, or the like. This results in the benefit that when the lid is opened, all of the fuses are easily accessible. Conversely, when the lid is closed, the fuses and the circuitry contained within the fuse box are protected from environmental influences. Thus, individual protective caps or other sealing arrangements for the strip fuses are not needed. As can be seen from the foregoing, a primary object of the invention is to provide a fuse box that is directly connectable to a motor vehicle battery terminal.

A further object of the invention is the provision of a fuse box having multiple screening zones formed in the fuse box housing to collect melted material generated from blown fuses so that the melted material is contained within the screening zone to prevent damage to the remaining circuits in the fuse box.

Another object of the invention is the provision of a fuse box that is mechanically coded so that wrong sized fuses cannot be inadvertently inserted into the fuse box where they do not belong.

Yet another object of the invention is the provision of a fuse box that provides mechanical torsional integrity to the strip fuses so that they are not bent or otherwise mechanically damaged as they are installed or connected to the busbar or as their free ends are connected to the electrically serviced circuit.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof, and wherein.

DETAILED DESCRIPTION FOR THE PREFERRED EMBODIMENT

Figure 1:
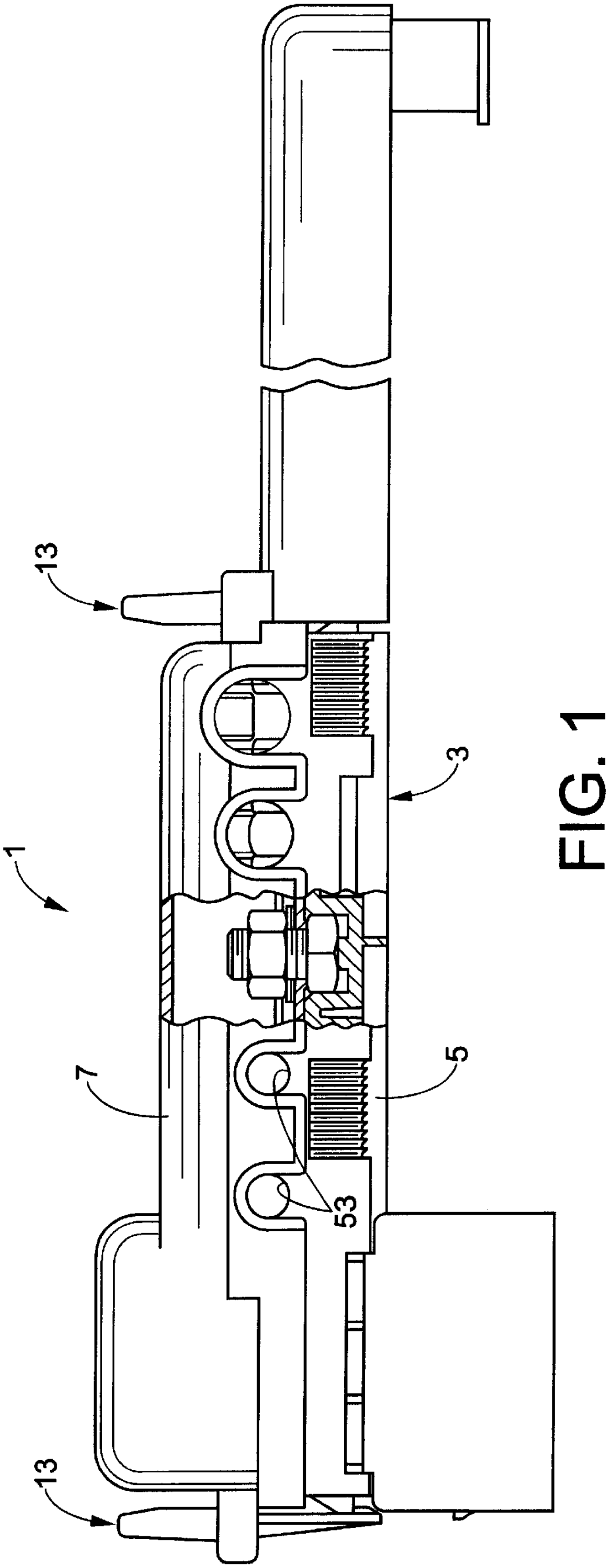
FIG. 1 is a side elevational view of the fuse box formed in accordance with the present invention.

Referring now to the drawings wherein the showings are for the purposes of illustrating the preferred embodiment of the invention only and not for purposes of limiting same, FIGS. 1, 2, 4 and 5 illustrate a fuse box 1 formed in accordance with the present invention. The fuse box includes a housing 3 which is essentially formed in two parts including a lower bottom member 5 and an upper lid member 7. The bottom and lid members 5, 7 cover at least a portion of the fuse box that is adapted to receive a plurality of electrical fuses forming a fuse acceptance region 9 best illustrated in FIG. 2.

Figure 2:
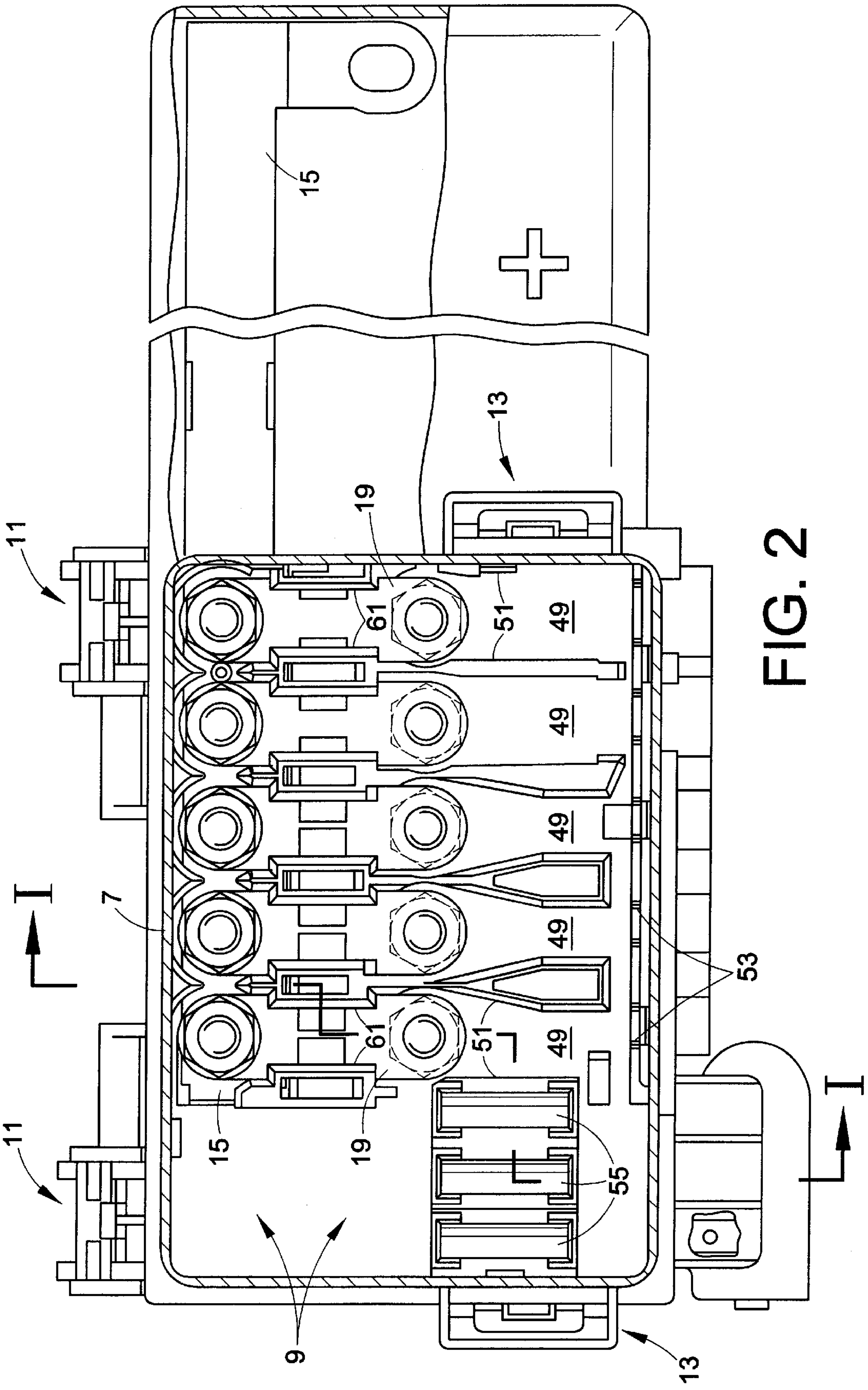
FIG. 2 is a top view in partial cross-section of the fuse box shown in FIG. 1.
Figure 4:
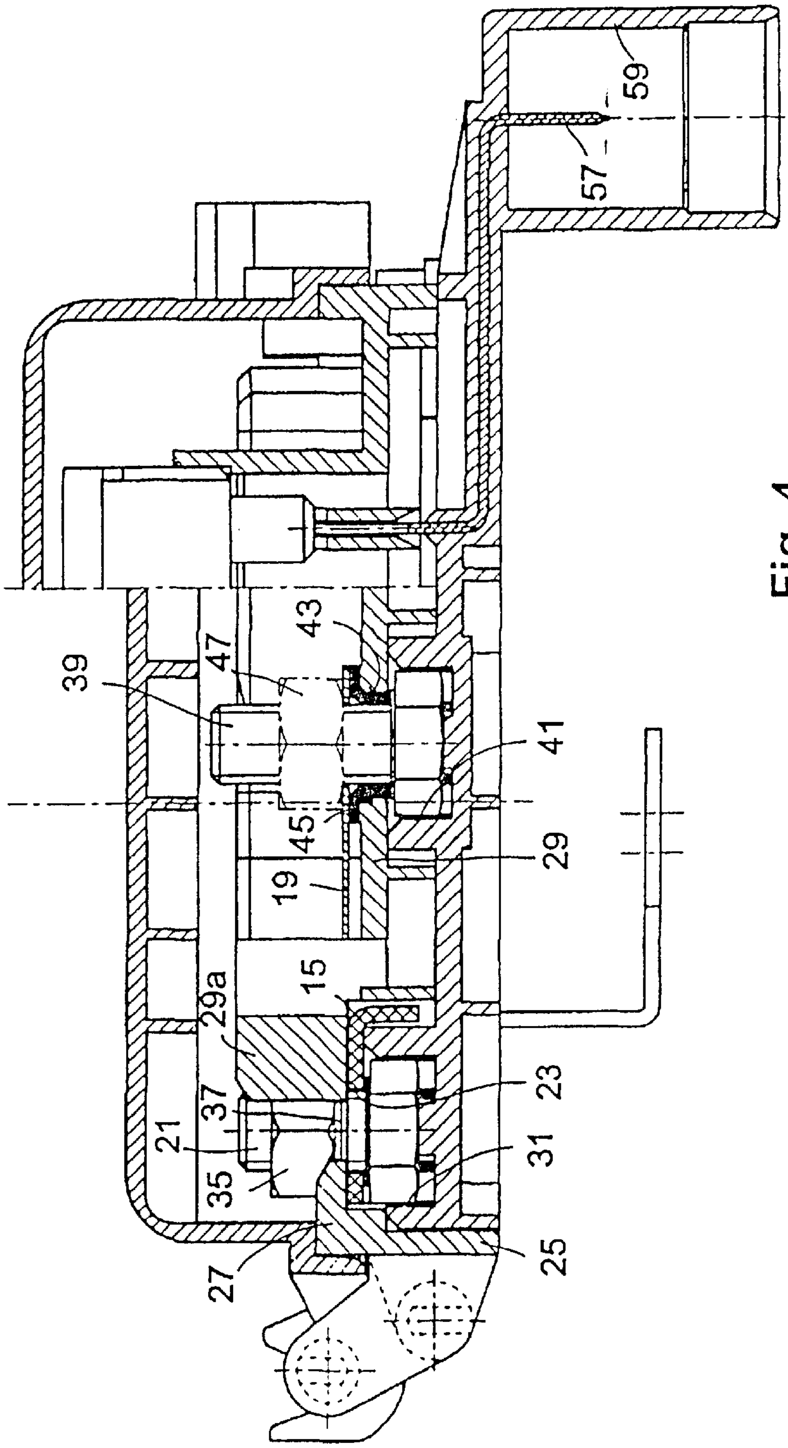
FIG. 4 is a cross-sectional view taken along line I—I of FIG. 2.

As is shown in FIGS. 2 and 4, the lid member 7 is swingably or pivotably connected with the bottom member 5 via articulations 11 or other suitable hinging type mechanisms so that the lid member 7 can be selectively moved between opened and closed positions relative to the bottom member 5 to gain access to the several fuses contained within the fuse box. The lid member 7 is selectively held in its closed position by a releasable fastener means 13, preferably a snap latch as shown in FIGS. 1 and 2. An elongate busbar 15 protrudes into the fuse acceptance region 5. In addition, the busbar 15 is preferably formed in an L-shape (FIG. 2) having an end that is adapted for direct connection to a respective pole 17 of a motor vehicle battery (FIG. 5).

Figure 5:
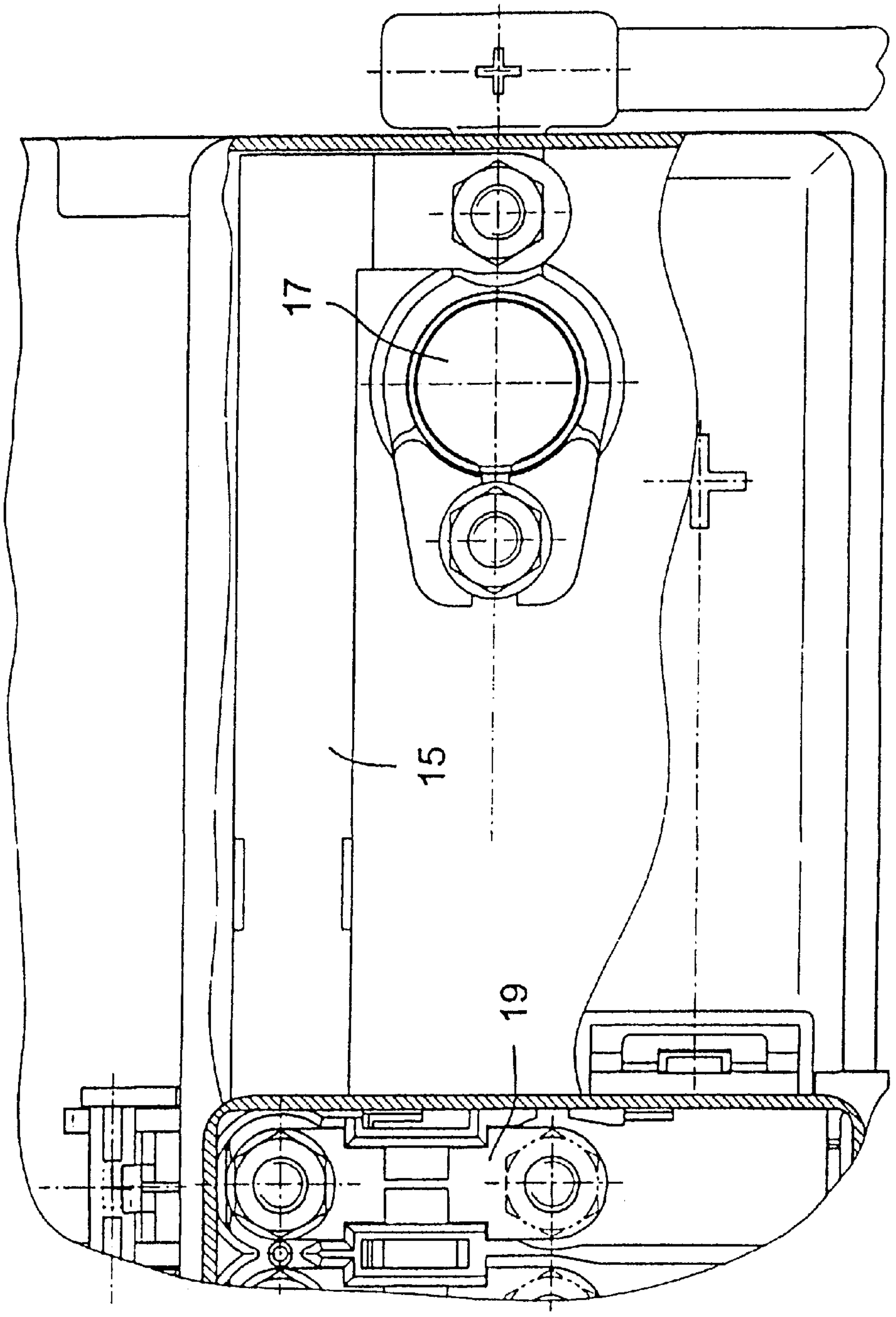
FIG. 5 is an enlarged, partially refracted view of a portion of the fuse box shown in FIG. 2 illustrating the fuse box mounted directly to the terminal of a motor vehicle battery.

As can be seen from the Figures, a region of the fuse box represented on the right in FIGS. 1 and 2 and in enlarged form in FIG. 5, serves the purpose of covering the respective battery pole, preferably the positive terminal of the battery. The region of the fuse box covering the battery pole can be alternatively designed so that it is openable by means of a lid so that the respective terminal pole of the battery is also accessible upon opening the lid or by completely removing the fuse box from the battery such as when it is necessary to connect a starter cable or the like.

The elevational view of the subject fuse box shown in FIG. 2 illustrates the lid member 7 in cross section. That drawing illustrates five strip fuses 19 that are each connected on one end with a busbar 15. The strip fuses are both mechanically and electrically connected to the busbar.

As shown in FIG. 4, threaded bolts 21 are provided in the arrangement illustrated for fastening each of the strip fuses 19 to the busbar 15. As shown in the drawing, the threaded bolts are preferably cap screws illustrated on the left in FIG. 4 and near the top of the acceptance region 9 in FIG. 2. The threaded portions of the bolts 21 respectively project through a bore hole 23 formed in the busbar 15. The busbar is fixed to the housing in the arrangement shown by means of a connection part 25 which is connected to the bottom member 5 of the housing 3. The connection part 25 includes a shoulder surface 27 extending beyond and over on top of the busbar 15. The busbar is also connected to the housing by means of an intermediary bottom member 29 which is selectively inserted into the bottom member 5 of the housing whereby the intermediary bottom member 29 likewise extends beyond and over the top of the busbar 15 by means of a suitably disposed and arranged engagement area 29*a*.

As indicated above, the threaded bolts 21 are preferably fashioned in the form of a cap screw and, as illustrated in the drawings, are disposed in the housing member in a position such that the head of each cap screw is accepted into an acceptance region 31 between the bottom member 5 of the housing and the fixed busbar 15. Thus, through this construction and arrangement, the threaded bolts 21 are captively held in place by the housing.

Figure 3:
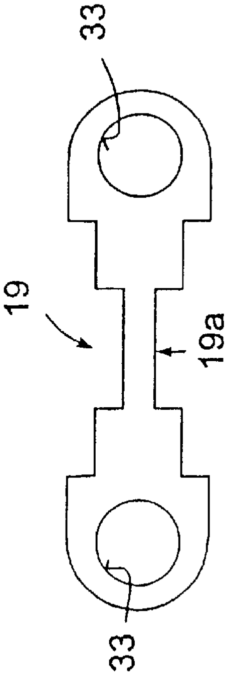
FIG. 3 is a plan view of an electrical strip fuse of the type used in the fuse box shown in FIGS. 1 and 2.

As shown best in FIG. 3, the strip fuses 5 are formed as a single element having a bore hole 33 adapted to accept the threaded portion of the threaded bolts 21 therethrough.

As shown best in FIG. 4, after the strip fuses 19 are placed onto the threaded bolts 21, they are fastented to the busbar 15 by means of a nut 35. A set of spring plates 37 are preferably disposed between the underside of the nuts 35 and the top surfaces of the strip fuses 19. The spring plates 37, due to their pre-stressed shape and resilient property, ensure permanent continuous maintenance of a specified starting torque or a specified press-in force on the strip fuses 19 and the busbar 15 against the housing member 5. The spring plates 37 act as lock washers between the nuts 35 and the strip fuses 19.

The second ends of the strip fuses that are not connected to the busbar 15 are likewise retained in the housing 3 by means of an additional set of threaded bolts 39 shown on the right in FIG. 4 and near the bottom of the acceptance region 9 in FIG. 2. The threaded bolts 39 are preferably cap screws having heads accepted in an acceptance region 41 formed in the bottom member 5 of the housing 3. The threaded portions of the threaded bolts 39 protrude through bore holes 43 formed in and through the intermediary bottom member 29. The threaded bolts 39 are thereby captively held in place by the housing 3. The intermediary bottom member 29 is selectively connectable to the bottom housing member 5, preferably in a snap-in fashion. Of course, the intermediary bottom member 29 can also be firmly connected with the bottom housing member 5 such as, for example, by gluing the intermediary bottom member 29 to the bottom housing member 5. As a result, the water tightness of the housing can be more easily guaranteed when the lid is closed.

With continued reference to FIG. 4, a spring bushing 45 is pressed into a bore 43 formed in the intermediary bottom member 29. Because of the press-fit, the spring bushing 45 is likewise captively retained in the housing or in the intermediary bottom member 29 by frictional force.

Further as shown in the drawing, the spring busing 45 includes an upper, essentially radially extending flat collar region that is adapted to receive the respective end of the strip fuses 19 thereon whereby the bore holes 33 provided in the fuse ends serve, in turn, for placing the strip fuses onto the threaded bolts 39.

A cable terminal (not shown) is likewise provided with a corresponding bore hole or recess. In an assembled configuration, the cable terminals are placed onto the threaded bolts 39. The cable terminals can be mechanically fixed by means of a bolt 47 (shown in dotted line in FIG. 4) and electrically connected with the strip fuses 19. The spring bushings 45 are resiliently biased to serve to maintain a specified starting torque and to maintain a specified press-in force of the cable terminal at the strip fuses 19. The spring bushings 45 act as lock washers between the nuts 47 and the set of cable terminals at the strip fuses 19.

With particular reference now to FIG. 2, a plurality of lateral walls 61 are formed on the intermediary bottom member 29 at the lateral regions of the strip fuses 19 as shown. The lateral walls serve as contact surfaces for mechanically engaging the sides of the strip fuses 19. The engagement between the lateral walls 61 and the strip fuses 19 prevents any twisting or deformation of the strip fuses during tightening of the nuts 35 and 47. Furthermore, the lateral walls 61 serve at the same time for screening off fusible zones 19*a* (FIG. 3) of the strip fuses. As a result, unwelcome influences during melting of the fusable zones 19*a* of the strip fuses 19 upon the remaining fuses and other connection elements contained within the housing of the fusebox are avoided. The lateral walls prevent the migration of melted fuse material into areas of the housing beyond the screening zone of each respective fuse.

As best shown in FIG. 2, cable terminal coding zones 49 are provided adjacent the bolts 39 connected to the free ends of the fuses. The cable terminal coding zones 49 serve to accept respective cable terminal ends therein. In order to guarantee coding of the cable terminals, each coding zone 49 is designed differently so that only the appropriately shaped cable terminals having an essentially complementary external contour matching the shape of the coding zone can be installed in the applicable coding zone region 49. Only terminals having a corresponding shape will fit in the respective coding zone. In this manner, erroneous allocation of a cable terminal to an improper strip fuse 19 is avoided. For that purpose, a set of walls 51 are selectively provided on the intermediary bottom member 29. The walls serve to laterally limit the coding zones 49 and define respective contours thereby.

As is common practice in fuse boxes of the type described, cables connected to respective cable terminals are passed to the outside of the fuse box through respective openings formed in the fuse box housing. In accordance with the present invention and with reference once again to FIG. 1, a plurality openings 53 are provided in the lateral wall of the housing 3. The diameter of each opening 53 is sized to correspond to the anticipated diameter of the respective cable expected to extend therethrough based on anticipated current carrying capacity of the cable. Thus, in accordance with the present invention, each respective opening 53 provided in the lateral wall of the housing 3 provides additional mechanical cable coding so that only the correct cable is permitted to enter the lateral wall of the housing for connection to the respective cable terminals within the fuse box adjacent the openings 53.

As shown best in FIGS. 1 and 2, the openings 53 are formed by essentially vertically extending complementary upward and downward slots or curved semi-circular openings formed in the sidewall of the intermediary bottom member 29. The slots oriented in the upward direction are formed in a sidewall of the intermediary bottom member 29. The downwardly directed open slots are formed in the lid member 7. A benefit of the present invention enabled by the complementary upwardly and downwardly open slots is that the fuse box is made adjustable relative to the number of required strip fuses and the thickness of the fuse-protectable cable or cable strands. For such adaptation, appropriate change needs only be made to the extrusion tool for the intermediary bottom member and, in some cases, to the extrusion tool for the lid member, or both.

As indicated above, the strip fuses are usually used to fuse protect cable strands carrying high current loads and, as a rule, are exchanged or maintained only by trained technical personnel. Typically, strip fuses protect circuits having rated currents of 100 amperes and above and therefore generally fuse, melt, or blow only when there is a serious defect in the electrical wiring of the motor vehicle.

Not all motor vehicle circuits are high power circuits, however. This being the case, the fuse box 1 also serves for housing traditional smaller flat-type fuses 55 to electrically fuse protect smaller electrical consumers in the motor vehicle such as, for example, anti-locking brake systems, air bags, headlights, and other power accessories. These smaller flat-type fuses 55 may be insertable flat-type fuses or barrel-type fuses known in the art. Electrical connection of these fuses within the fuse box housing customarily takes place by means of connection contacts 57 best shown in FIG. 4. The housing member or, alternatively, the bottom member 5 includes an acceptance zone 59 adapted to receive one or more plugs for contacting the flat fuses 55 disposed within the housing through one or more suitable rigid formed conductor members.

As previously mentioned, the lid member 7 in combination with the bottom member 5 of the housing is formed in such a manner that a water and moisture proof enclosure is provided when the lid member 7 is closed onto the bottom housing member 5.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A fuse box for use in an associated motor vehicle having electric power accessories powered by an electric battery, the fuse box comprising:

a housing directly connectable to the electric battery of the associated motor vehicle;

a plurality of strip fuses disposed within said housing, the plurality of strip fuses providing fuse protection to at least a one of an electric power consumer within the associated motor vehicle and an electric current carrying conductor within the associated motor vehicle; and, a common busbar directly connectable to a pole of said electric battery, the common busbar being both mechanically and electrically connected to said plurality of strip fuses, each of said plurality of strip fuses including a pair of bore holes formed therein for mounting the strip fuses within the housing onto associated pairs of threaded bolts using corresponding associated nuts to hold each of the plurality of strip fuses in place with at least one end of each of the plurality of strip fuses being fastened to said common busbar.

2. The fuse box according to claim 9 wherein:

said intermediary bottom member defines a bore hole for selectively receiving a threaded portion of said pairs of threaded bolts; and, said housing selectively captively retains a head portion of said pairs of threaded bolts.

3. The fuse box according to claim 1 wherein said housing defines a screening zone positioned adjacent a melting zone of at least a first strip fuse of said plurality of strip fuses, the screening zone being operative to screen off the melting zone of the first strip fuse to prevent melted material from migrating from the screening zone and into areas in said housing outside said screening zone.

4. The fuse box according to claim 3 wherein said screening zone is configured to provide mechanical coding to enable only selected strip fuses having a corresponding mechanical coding shape to be accommodated in the screening zone.

5. The fuse box according to claim 1 wherein the housing selectively receives i) at least one electrical fuse for providing said fuse protection to said electrical power consumer within the associated motor vehicle, and ii) at least one of said plurality of strip fuses for providing said fuse protection to said electric current carrying conductor within the associated motor vehicle.

6. The fuse box according to claim 1 wherein said housing includes a lid member for providing a fluid tight sealing of said plurality of strip fuses disposed within the housing.

7. The fuse box according to claim 1 wherein said pairs of threaded bolts associated with said pairs of bolt holes in said plurality of strip fuses are captively retained in said housing to enable cable terminals to be connected to free ends of said plurality of strip fuses opposite the ends that are connected to said busbar.

8. The fuse box according to claim 1 further comprising an intermediary bottom member selectively engagable with the housing of the fuse box.

9. The fuse box according to claim 8 wherein said pairs of threaded bolts associated with said pairs of bolt holes in said plurality of strip fuses are captively retained in said housing to enable cable terminals to be connected to free ends of said plurality of strip fuses opposite the ends that are connected to said busbar.

10. The fuse box according to claim 9 further comprising a spring bushing received on said pairs of threaded bolts between said strip fuses and said associated nuts for maintaining a predetermined starting torque on said associated nuts.

11. The fuse box according to claim 10 wherein said spring bushing includes a cylindrical region extending in an axial direction onto said threaded bolts, the cylindrical region being captively retained in said housing.

12. The fuse box according to claim 10 wherein said spring bushing is press fitted into a bore hole formed in said intermediary bottom member.

13. The fuse box according to claim 10 wherein said spring bushing includes a radially extending collar providing a flat surface for selectively engaging said strip fuses.

14. The fuse box according to claim 1 wherein said housing includes a set of lateral contact surfaces positioned to engage said strip fuses to prevent twisting and deformation of the strip fuses as they are mounted within the housing onto said associated pairs of threaded bolts using said corresponding associated nuts.

15. The fuse box according to claim 1 wherein the housing includes a cable terminal coding zone adjacent at least one end of one of the plurality of strip fuses providing mechanical coding to said housing to enable only selected conductor terminal connectors having a corresponding mechanical coding shape to be accommodated in the terminal coding zone.

16. The fuse box according to claim 1 further comprising an intermediary bottom member selectively engagable with the housing of the fuse box, the intermediary bottom member forming at least a one of:

a set of lateral contact surfaces positioned to engage said strip fuses to prevent twisting and deformation of the strip fuses as they are mounted within the housing onto said associated pairs of threaded bolts using said corresponding associated nuts;

a screening zone positioned adjacent a melting zone of at least a first strip fuse of said plurality of strip fuses, the screening zone being operative to screen off the melting zone of the first strip fuse to prevent melted material from migrating from the screening zone and into areas in said housing outside said screening zone;

a mechanical coding zone to enable only selected strip fuses having a corresponding mechanical coding shape to be accommodated in the screening zone; and, a cable terminal coding zone adjacent at least one end of one of the plurality of strip fuses providing mechanical coding to said housing to enable only selected conductor terminal connectors having a corresponding mechanical coding shape to be accommodated in the terminal coding zone.

17. The fuse box according to claim 16 wherein said pairs of threaded bolts associated with said pairs of bolt holes in said plurality of strip fuses are captively retained in said housing to enable cable terminals to be connected to free ends of said plurality of strip fuses opposite the ends that are connected to said busbar.

18. The fuse box according to claim 17 wherein:

said intermediary bottom member defines a bore hole for selectively receiving a threaded portion of said pairs of threaded bolts; and, said housing selectively captively retains a head portion of said pairs of threaded bolts.

19. The fuse box according to claim 18 further comprising a spring bushing received on said pairs of threaded bolts between said strip fuses and said associated nuts for maintaining a predetermined starting torque on said associated nuts.

20. The fuse box according to claim 19 wherein said spring bushing includes a cylindrical region extending in an axial direction onto said threaded bolts, the cylindrical region being captively retained in said housing.

21. The fuse box according to claim 20 wherein said spring bushing is press fitted into a bore hole formed in said intermediary bottom member.

22. The fuse box according to claim 21 wherein said spring bushing includes a radially extending collar providing a flat surface for selectively engaging said strip fuses.

23. A fuse box comprising:

a housing selectively receiving, at a first location, an associated electrical strip fuse having a melting zone formed therein to melt and open a circuit conducting current beyond a predetermined threshold;

at least one screening zone formed by the housing defining an area adjacent to said first location for collecting melted material generated when the melting zone of the associated strip fuse melts so that the melted material is contained within the screening zone to prevent damage to the fuse box;

a busbar disposed in said housing, the busbar being selectively directly connectable to a pole of an electric battery;

a lateral surface defined by the housing for selectively engaging said electrical strip fuse to prevent twisting and deformation of the strip fuse as it is fastened to the busbar;

a fuse coding zone mechanically coding a portion of said housing to prevent inadvertent misinstallation of an electrical strip fuse having improper current carrying capacity; and, a terminal coding zone formed in the housing for providing mechanical coding to an area of said housing to prevent inadvertent misinstallation of a terminal joined to an electrical conductor having improper current carrying capacity.

24. The fuse box according to claim 23 wherein at least a one of said lateral surface, said fuse coding zone and said terminal coding zone are defined by an intermediary bottom member selectively engagable with said housing.

25. A fuse box for use in motor vehicles, the fuse box comprising:

a housing;

an electrical strip fuse having a melting zone formed therein designed to melt and open a circuit conducting current beyond a predetermined threshold;

at least one screening zone for collecting melted material generated when the melting zone of the associated strip fuse melts so that the melted material is contained within the screening zone to prevent damage to the fuse box; and, a lateral surface defined by an intermediary bottom member selectively engagable with the housing for selectively engaging said electrical strip fuse to prevent twisting and deformation of the strip fuse as it is fastened to the fuse box.

26. A fuse box for use in motor vehicles, the fuse box comprising:

a housing selectively receiving an associated electrical strip fuse at a first location, the strip fuse having a melting zone formed therein designed to melt and open a circuit conducting current beyond a predetermined threshold;

at least one screening zone formed by the housing defining an area adjacent to said first location for collecting melted material generated when the melting zone of the associated strip fuse melts so that the melted material is contained within the screening zone to prevent damage to the fuse box; and, a fuse coding zone mechanically coding a portion of said housing to prevent inadvertent misinstallation of an electrical strip fuse having improper current carrying capacity.

27. The fuse box according to claim 26 wherein said fuse coding zone is defined by an intermediary bottom member selectively engagable with said housing.

* * * * *